(12) United States Patent
Knecht et al.

(10) Patent No.: US 9,635,043 B1
(45) Date of Patent: Apr. 25, 2017

(54) METHOD AND APPARATUS FOR CAUSING A DELAY IN PROCESSING REQUESTS FOR INTERNET RESOURCES RECEIVED FROM CLIENT DEVICES

(71) Applicant: CLOUDFLARE, INC., San Francisco, CA (US)

(72) Inventors: Dane Orion Knecht, San Francisco, CA (US); John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 15/179,516

(22) Filed: Jun. 10, 2016

(51) Int. Cl.
*H04L 29/06* (2006.01)
*H04L 29/08* (2006.01)
*H04L 29/12* (2006.01)

(52) U.S. Cl.
CPC ...... *H04L 63/1416* (2013.01); *H04L 61/1511* (2013.01); *H04L 63/0428* (2013.01); *H04L 63/101* (2013.01); *H04L 63/1458* (2013.01); *H04L 67/28* (2013.01); *H04L 67/42* (2013.01); *H04L 2463/142* (2013.01)

(58) Field of Classification Search
CPC . H04L 63/08; H04L 63/0807; H04L 63/0823; H04L 63/1441; H04L 63/10; G06F 21/31; G06F 21/335
USPC ........................................................ 726/23
See application file for complete search history.

(56) References Cited

U.S. PATENT DOCUMENTS

| 2003/0147401 | A1* | 8/2003 | Kyronaho | ............... | H04L 12/14 370/395.41 |
| 2013/0263230 | A1* | 10/2013 | Gorodyansky | ....... | H04L 63/083 726/4 |
| 2014/0380096 | A1* | 12/2014 | Dodson | ............... | G06F 11/1402 714/16 |
| 2015/0350208 | A1* | 12/2015 | Bayramkul | ......... | H04L 63/0884 726/9 |

(Continued)

OTHER PUBLICATIONS

Droms, Ralph, and William Arbaugh. Authentication for DHCP messages. No. RFC 3118. 2001.*

(Continued)

*Primary Examiner* — Syed Zaidi
(74) *Attorney, Agent, or Firm* — Nicholson De Vos Webster & Elliott LLP

(57) ABSTRACT

A method and apparatus for causing a delay in processing requests for Internet resources received from client devices is described. A server receives from a client device a request for a resource. The server transmits a response to the first client device indicating that access to the resource is temporarily denied. The response includes a cryptographic token associated with the first request and a predetermined period of time during which the first client device is to wait prior to transmitting another request to access the resource. The server receives a second request for the resource, upon determining that the second request includes a valid cryptographic token, the server causes the second request to be processed. The server receives a third request for the resource, and upon determining that the third request does not include a valid cryptographic token, the server blocks the third request.

24 Claims, 5 Drawing Sheets

(56) References Cited

U.S. PATENT DOCUMENTS

2016/0021118 A1* 1/2016 Roth .................. H04L 9/083
 726/4
2016/0026995 A1* 1/2016 Edmiston ............. G06Q 20/204
 705/44

OTHER PUBLICATIONS

Blocking Brute Force Attacks, Retrieved from http://www.owasp.org/index.php?title=Blocking_Brute_Force_Attacks&oldid=210449, This page was last modified on Mar. 4, 2016, at 04:58, 5 pages.
M'Raihi D., et al., "TOTP: Time-Based One-Time Password Algorithm," Internet Engineering Task Force (IETF), RFC 6238, May 2011, pp. 1-16.

* cited by examiner

METHOD AND APPARATUS FOR CAUSING A DELAY IN PROCESSING REQUESTS FOR INTERNET RESOURCES RECEIVED FROM CLIENT DEVICES

FIELD

Embodiments of the invention relate to the field of network services; and more specifically to protection against attacks on Internet resources.

BACKGROUND

Attacks on domains hosted on servers (e.g., DoS attacks, bruteforce login attacks (login to a website or to an web API)) are becoming more commonplace on the Internet and are difficult to detect and mitigate. Generally speaking, a DoS attack is launched by sending a large amount of packets to the domain with the intention to cause the domain to be unavailable or respond slowly to legitimate traffic. A bruteforce login attack involves systematically transmitting requests to the domain for checking all possible keys or passwords until the correct one is found to access the resources hosted at the domain.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
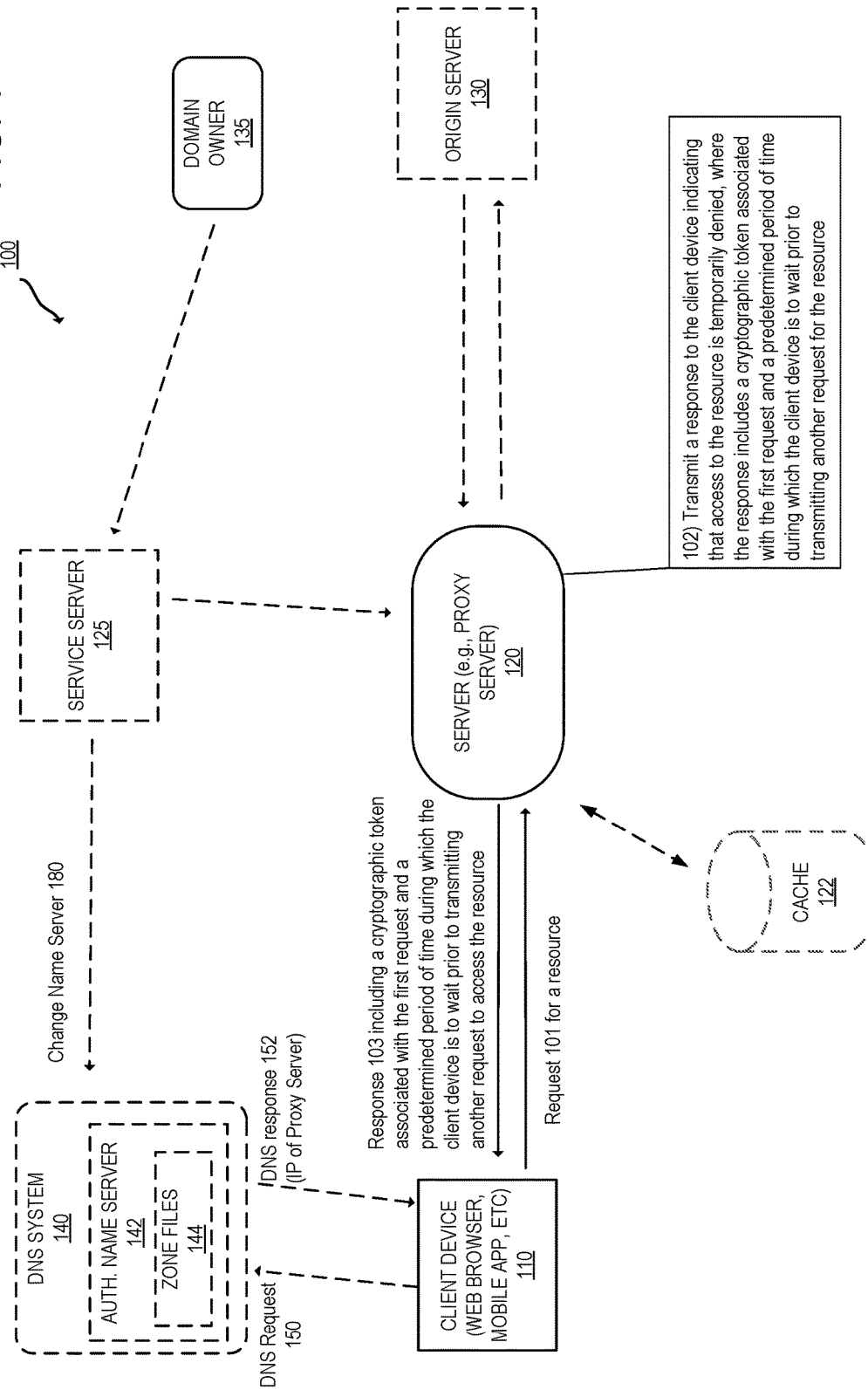
FIG. 1 illustrates a block diagram of an exemplary architecture in which a server is operative to cause a delay in processing requests for internet resources received from client devices according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and an apparatus for protecting resources of a domain hosted on a server from an attack by delaying requests received from a client device are described. In one embodiment, a server receives from a client device a request for a resource. The server transmits a response to the client device indicating that access to the resource is temporarily denied. The response includes a cryptographic token associated with the first request and indicating a predetermined period of time during which the client device is to wait prior to transmitting another request to access the resource at the domain. In some embodiments, the response is transmitted upon determination that the resource is under attack. Upon receipt of another request for the resource, the server determines whether the other request includes a valid token. The validity of token is an indicator that the other request is received at the server after the predetermined period of time has elapsed since the first request for the resource was received. When the cryptographic token is determined to be valid, the server causes the other request to be processed. Alternatively, when the cryptographic token is determined to be invalid, the server blocks the request. Thus, the method and apparatus presented herein enable the introduction of delays when responding to requests for resources to a domain, consequently preventing an attacker from overwhelming the domain or from succeeding in a brute-force attack.

FIG. 1 illustrates a block diagram of an exemplary architecture 100 in which a server is operative to cause a delay in processing requests for internet resources received from client devices according to one embodiment. The architecture includes a client device 110, a server 120, a domain owner 135 and optional components such as origin server 130, service server 125 and DNS system 140.

The client device 110 is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources hosted on a server. In a non-limiting example, a user at the client device 110 may request access to secured accounts. The accounts are protected through a secure cryptographic connection requiring account information (e.g., username and password) to login into the account. In some embodiments, the client device 110 is a malicious device (i.e., including malicious code (e.g., bots, malware, etc.) and/or operated by a malicious user) operative to launch an attack on the resources. In one embodiment, the attack can be a brute-force login attack (e.g., an API login attack), which involves the server hosting the resources receiving multiple requests for checking multiple account information combinations (e.g., all possible cryptographic keys or passwords associated with a username) until the correct account information is found and access to the resources is gained. In other embodiments, the attack can be any unauthorized request to access the resources. In some embodiments, the attack can be a Denial of Service (DoS) attack in which a large amount of packets are sent to the domain with the intention of causing the domain to be unavailable or respond slowly to legitimate traffic.

The server 120 is a computing device coupled with the client device through a network (not illustrated). The server 120 is operative to receive and cause the processing of requests for Internet resources hosted at one or more domains. For example, the domain owner 135 owns one or more domains (e.g., example.com) for which the server 120 may receive requests. The server may receive requests for the resources at a given location of the domain (e.g., example.com/login). In one embodiment and as described in greater detail later herein, the server 120 is operative to protect Internet resources owned by the domain owner 135 by delaying responses to requests for the resources.

In some embodiments, the server 120 may be an origin server that may serve and/or generate network resources (e.g., web pages, images, word processing documents, PDF files movie files, music files, or other computer files). For example the server 120 may host the domain of the domain owner 135 (e.g., example.com) and is operative to respond to requests for resources at that domain. Although not illustrated in FIG. 1, it should be understood that the network resources of the origin servers may be stored separately from the device that responds to the requests.

In another embodiment, the server 120 is a proxy server part of a cloud-based proxy service which provides different services for customers (e.g., the domain owner 135). In this embodiment, the server 120 is situated between client devices (e.g., client device 110) and the origin server 130. In one embodiment, the server 120 is a reverse proxy server. Certain network traffic is received and processed through the server 120. For example, web traffic (e.g., HTTP requests/responses, HTTPS requests/responses, SPDY requests/responses, etc.) for domains of the origin server 130 may be received and processed at the server 120. In one embodiment, the domain owner 135 are customers of the cloud-based proxy service. The owner of the server 120 is typically different than the owner of the origin server 130. In addition, the server 120 is not typically part of the local network of the origin server 130. For example, the server 120 is outside of the local area network of the origin server 130 and is typically not physically accessible by the owner/administrator of the origin server 130.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides protection against attacks on resources at domains hosted on origin server by enabling the server 120 to delay responses to requests for the resources.

Generally speaking, the server 120 receives certain network traffic from the client devices 110 requesting Internet resources. For example, the server 120 may receive requests for an action to be performed on an identified resource (e.g., an HTTP GET request, an HTTP POST request, other HTTP request methods, or other requests to be applied to an identified resource on an origin server) from the client device 110. When the server 120 is a proxy server, the request received from the client device 110 may be destined for a domain hosted at an origin server (e.g., origin server 130).

The server 120 analyzes incoming traffic and takes one or more actions on the incoming traffic. As will be described in greater detail later herein, the incoming traffic may be part of an attack on resources of a domain (brute-force attack on an API, a DoS attack, or other types of attacks) and steps may be taken to mitigate the attack. However, assuming, for example that there is not a threat, the server 120 may cause the incoming traffic to be processed. In some embodiments, when the server 120 is a proxy server it may transit the outgoing traffic to the appropriate origin server 130. For example, the proxy server may transmit a request (e.g., an HTTP GET request) for a resource of the origin server 130. For example, an origin server may transmit a response (e.g., an HTTP response) with the requested resource to the proxy server. The proxy server may analyze the incoming traffic including the response and take one or more actions, including, for example, transmitting the response to the requesting client device. The proxy server may also cache resources for the domains and respond to requests from client devices locally if the requested resource is in cache (e.g., stored in cache 122).

In some embodiments, incoming traffic is received at a particular server 120 as a result of a DNS request 150 for a domain of one of the domain owner 135 resolving 152 to an IP address of the server 120. By way of example, DNS record(s) for the domain "example.com" may resolve to an IP address of a server 120. In some embodiments, multiple domains that may be owned by different domain owners may resolve to the same server 120 (e.g., the same IP address or a different IP address of the server 120).

In some embodiments, the domain owner 135 is a customer of a cloud-based service and registers their respective domain for the service. For example, the authoritative name servers for each domain of the domain owner 135 may be changed to the authoritative name server 142 of the service at operation 180. It should be understood that the backup authoritative name server serving the domain may also be changed to an authoritative name server of the service. The zone file record (144) for the domain is also changed such that DNS resolution requests for the domain owned by the domain owner 135, which corresponds with the origin server 130, resolve to the server 120. In one embodiment, a customer (e.g., the domain owners 135 or other entity (e.g., web administrators) on behalf of the domain owner 135) may use the service server 125 to change their authoritative name server to the authoritative name server 142 and change their zone file to have their domain point to the server 120.

The service server 125 is an electronic device operated by the cloud-based proxy service, which provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file).

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request for a domain corresponding to the origin server 130, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

When the server 120 is a proxy server of a cloud-based proxy service, while FIG. 1 illustrates a single server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates a single origin server 130 and a single client device 110 respectively coupled with the server 120, in some embodiments the server is coupled with multiple origin servers and/or with multiple client devices. Moreover, in some embodiments, there are multiple proxy servers providing service for a particular domain.

In some embodiments, the client device 110 makes a request 101 for resources (e.g., an HTTP GET request, or other request), which is transmitted to the server 120. In some embodiments, the request 101 is a request to login to a user's account (e.g., request to access a resource at "example.com/login" location) and includes account information. The account information (e.g., login credential) enable the client device to login into the user's account and access protected resources. For example the account information can include a username (e.g., name, email address, phone number, or any other identifier identifying the account's user) and a password (i.e., acting as a cryptographic key for associated with the username) In some embodiments, the request is transmitted from the client device 110 as part of an attack on the first domain. For example the attack can be a brute-force attack for gaining access to one or more accounts of users. In this case the client device will systematically transmit requests to the server 120 for attempting to login to the account with multiple combinations of usernames and passwords until the correct one is found to access the resources. The first request can be one of these systematically transmitted requests.

The server 120 analyzes the request 101 and transmits (operation 5102) a first response 103 to the client device 110 indicating that access to the resource is temporarily denied. The response 103 includes a predetermined period of time during which the client device 110 is to wait prior to transmitting another request for the resource at the domain. The response may further include a cryptographic token that is not valid until the predetermined period of time has elapsed. In some embodiments, the cryptographic token can be valid for a second predefined amount of time following the predetermined period of time such that a server receiving the token during the second predefined amount of time (after the first predetermined period of time has elapsed) is able to verify the validity of the token. The server 120 generates the cryptographic token such that the token value would be difficult to predict by malicious users (e.g., a botnet operator). The cryptographic token is associated with the first request and/or the client device which transmitted the first request. For example, the cryptographic token may be generated based on the requested domain and/or the IP address of the client device transmitting the request.

The token value may be generated in a number of different ways. For example, the token value may be generated using a cryptographic algorithm such as Time-based One-time Password Algorithm (TOTP), described in RFC 6238, May 2011. As another example, a seeded pseudo-random number generator with a seed that is not publicly known (e.g., known only to the proxy server generating the pseudo-random number or to the cloud-based proxy service) may be used to generate the token value. As another example, an encrypted timestamp using a key that is not publicly known (e.g., a key known only to the proxy server generating the timestamp or known only to the cloud-based proxy service) may be used as the token value. As another example, a hashed and salted timestamp where the salt value is not publicly known (e.g., the salt value is known only to the server generating the timestamp or known only to the cloud-based proxy service, when the server 120 is a proxy server of the service) may be used as the token value. As yet another example, a hashed and salted timestamp where the salt value is publicly known but the timestamp has a random value appended to it that is not publicly known may be used as the token value.

In some embodiments, the server 120 is an origin server which is operative to process requests received from client devices and respond to the requests by retrieving the requested resources. The origin server may host the resources or may be coupled to another server hosting the resources. In these embodiments, upon receipt of the first request 101 for resources at a domain instead of responding to the request and transmitting the resources to the client device 110, the server transmits the response 103 temporarily denying access to the resources. The response 103 includes a cryptographic token associated with the request and a predetermined period of time during which the client device is to wait prior to transmitting another request to fort the resource at the domain.

In other embodiments, when the server 120 is a proxy server part of a cloud-based proxy service, the server 120 is operative to process requests received from the client device 110 by transmitting the request to the origin server 130 hosting the domain. In some of these embodiments, the server 120 can also retrieve the requested resources from a cache and may not transmit the requests to the origin server 130 prior to responding to the requests if the resources are available at the cache. Upon receipt of the first request instead of processing the request (by either transmitting the request to the origin server 130 or retrieving the resources from a cache) and transmitting the resources to the client device 110, the proxy server transmits response 103 temporarily denying access to the resources. The response 103 includes a cryptographic token associated with the request and a predetermined period of time during which the client device is to wait prior to transmitting another request for the resource.

In some embodiments, the server 120 may temporarily deny access to resources by transmitting the response 103 for all received requests. Alternatively, the server 120 may temporarily deny access to resources by transmitting the response 103 following a determination that the server (or the requested domain) is suspected to be under attack and that the initial request is potentially an illegitimate request. The determination that the server (or the requested domain) is suspected to be under attack may be performed through a variety of mechanisms, which may be different based on the type of attack. An administrator/owner of the server may specify that the server 120 is suspected to be under attack and that a heightened level of security is to be set for the server. In some embodiments, when the server 120 is a proxy server of a cloud-based proxy service, the service allows a customer (e.g., a domain owner 135) to specify that they are under attack and that they want a heightened level of security for their Internet resources hosted at the domain (e.g., website, databases, API, etc.). The heightened level of security will cause the cloud-based proxy service to add an additional set of protections to stop potentially malicious traffic from being passed to their origin server. For example, this may be used to counter a brute-force attack in which a malicious entity systematically transmits login requests to gain access to cryptographically secured resources.

For example the customer may have a website that is experiencing a slow response time, a high CPU load, etc., which may lead the customer to believe that they are under a DoS attack. The customer may further determine that a high number of unsuccessful successive login attacks have been attempted indicating that the resources are under a brute-force attack. After identifying to the cloud-based proxy service that they are under attack and/or that they want additional security protections, the service puts them into a heightened-security mode, which is referred herein as "under attack mode."

In one embodiment, the service may enable the under attack mode for a domain if an administrator suspects an attack or the proxy servers receive an abnormally high amount of requests to the domain. In one embodiment, the service enables the under attack mode for all visitors (and thus all requests for that domain will be subject to the under attack mode). In another embodiment, the service enables the under attack mode for only a selected number of visitors (e.g., the under attack mode may only be applied for requests from IP addresses that have previously been known to be involved in malicious behavior or which are suspected of being malicious).

Many attacks involve sending a large amount of traffic of a certain type to an intended target (e.g., a DoS attack) or repeated requests to an intended target in an attempt to gain access to cryptographically protected resources (e.g., brute-force attack to access users' accounts). In one embodiment, the server 120 automatically determines whether the server or the requested domain is suspected to be under attack by automatically determining that there is an abnormal amount of traffic destined to a particular destination (e.g., the traffic spikes from what is normally encountered, abnormal number of requests for a particular resource (e.g., abnormal number of unsuccessful login requests to an API as in a brute-force attack)). By way of example, the server 120 and/or the service server 125 may establish a threshold amount of what the normal traffic rate is for a domain and/or IP address and determine when traffic exceeds that threshold. In one embodiment, when the server 120 is a proxy server, the normal traffic rates may be individual and separate for a particular data center or proxy service node and the attack is identified for each individual proxy service node, while in some embodiments the attack is identified through an aggregation of traffic across all proxy service nodes that handle traffic for that domain.

By way of a specific example, an attack may be detected by using one or more parameters that exceed a threshold, including one or more of the following to a particular domain: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DoS attack. For example, the server 120 may detect if a domain has gone offline due to a heavy load, which may be an indication of an attack. As another example, the detection of a spike in metrics pertaining to a page or a resource request may be an indication of an attack (e.g., a particular request header, cookie, size of the request, non-standard control characters, a large number of GET parameters, a large number of POST parameters, a number of unsuccessful login requests, etc.).

Thus in some embodiments, upon determination that the server 120 is under attack, the server 120 transmits the first response 103, without processing the initial request 101. The response 103 indicates to the client device 110 that access to the resource is temporarily denied and that the request can be retransmitted after a predetermined period of time has elapsed. As a result, the request will not be transmitted to the origin server thereby saving the resources of the origin server from having to process the request.

Figure 2:
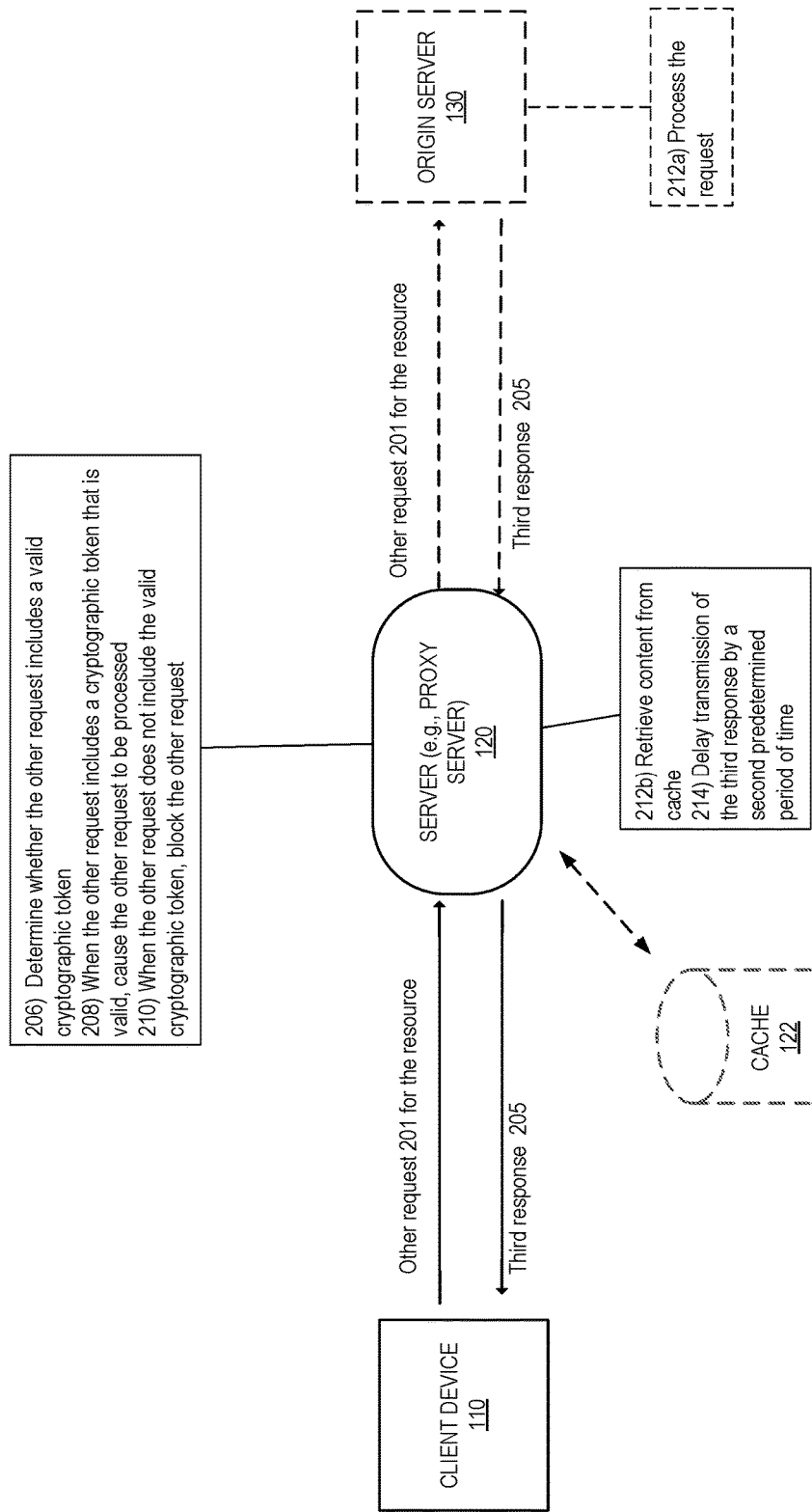
FIG. 2 illustrates a block diagram of exemplary operations performed when a client device receives a response to temporarily deny a request for resources at a domain in accordance with some embodiments.

FIG. 2 illustrates a block diagram illustrating exemplary operations performed when a client device receives a response to temporarily deny access for resources in accordance with some embodiments. The client device 110 transmits another request 201 for the resource. While in the illustrated embodiment, the request 201 provides from the client device 110, which transmitted the initial request 101, in other embodiments, the second request 201 may provide from another client device (e.g., when a distributed attack occurs, a request for a resource may provide from different client devices). In some embodiments, when the first request is a login request including a first set of login credential for accessing a cryptographically secure account (i.e., a first username and a first value for a password/key), the second request may include the first set of login credentials or a second set of login credentials (e.g., the same username and a new value for the password/key). Upon receipt of the second request 201, the server 120 determines, at operation 206, whether the second request includes a valid cryptographic token.

If the second request 201 does not include a valid cryptographic token (i.e., the token included in the request is not valid or the response did not include the token), the server 120 blocks the request 201 at operation 210. In one embodiment if the client device has attempted to alter the cryptographic token transmitted in a previous response (103) by the server 120 or alternatively if the token is transmitted before the predetermined period of time has elapsed, upon analysis of this token the server can detect the defect. In this case, the server blocks the request 201 providing from the client device 110 and may also log that the client device has been blocked. In some embodiments, the server 120 may transmit a response to the client device 110 indicating that the request 201 is a forbidden request (e.g., HTTP code 403 Forbidden). The response of the server 120 indicates that authentication was provided by the client device 110, but the authenticated client device is not permitted to perform the requested operation. For example, the client device 110 may not be permitted to perform the requested operation as the predetermined period of time has not yet elapsed. In some embodiments, the IP address of the client device making the request may also be added to a blacklist as suspicious and/or other rate limiting may be applied to the IP address of the client.

If the second request 201 includes a valid cryptographic token, indicating that the second request has been transmitted after the predetermined period of time has elapsed, the server 120 causes the request to be processed (operation 208). The server 120 analyzes the retransmitted request and takes one or more actions based on the request. The server 120 may process the request and transmit a response 205 to the requesting client device 110. In some embodiments, if the initial request is a login request with erroneous login credentials (username and password), the response 205 may include a denial to access the requested resources. Alternatively when the login credentials are valid, the response may include the requested resources. In some embodiments, when the server 120 is a proxy server of a cloud-based proxy service, it analyzes the request and may transmit the request 201 (e.g., HTTP GET destined to the requested domain "example.com") to the appropriate origin server 130. The origin server 130 may process the request (operation 212a) and then transmit the response 205 (e.g., an HTTP response) with the requested resource to the proxy server. The proxy server may analyze the incoming response 205 and take one or more actions, including, for example, transmitting the response to the requesting client device 110. In this embodiments, the proxy server may also cache resources for the domain (e.g., in cache 122) and may retrieve, at operation 212b, the requested network resource from the cache without transmitting the request to the origin server 130. In one embodiment, if the requested resource is not in the local cache of the proxy server or the cached resource has expired, the proxy server may request the resource from the origin server 130.

In some embodiments prior to transmitting the response, the server 120 may be operative to delay (operation 214) the response 205 by a second predetermined period of time introducing further delay in the response to the initial request in addition to the delay caused by the transmission of the first response 103.

The mechanisms presented herein, force a malicious client device to attempt access to a resource only after a predetermined period of time has elapsed from a previous attempt. For example, when the predetermined period of time is equal to an exemplary 5 seconds, a client device can transmit a request to access resources every 5 seconds. These mechanisms slow down brute-force attacks such that an attacker (distributed or not) can try new login credentials to access an account every few seconds significantly reducing the efficiency of these attacks and enabling administrator/owners of the resources to stop the attacks.

Figure 3:
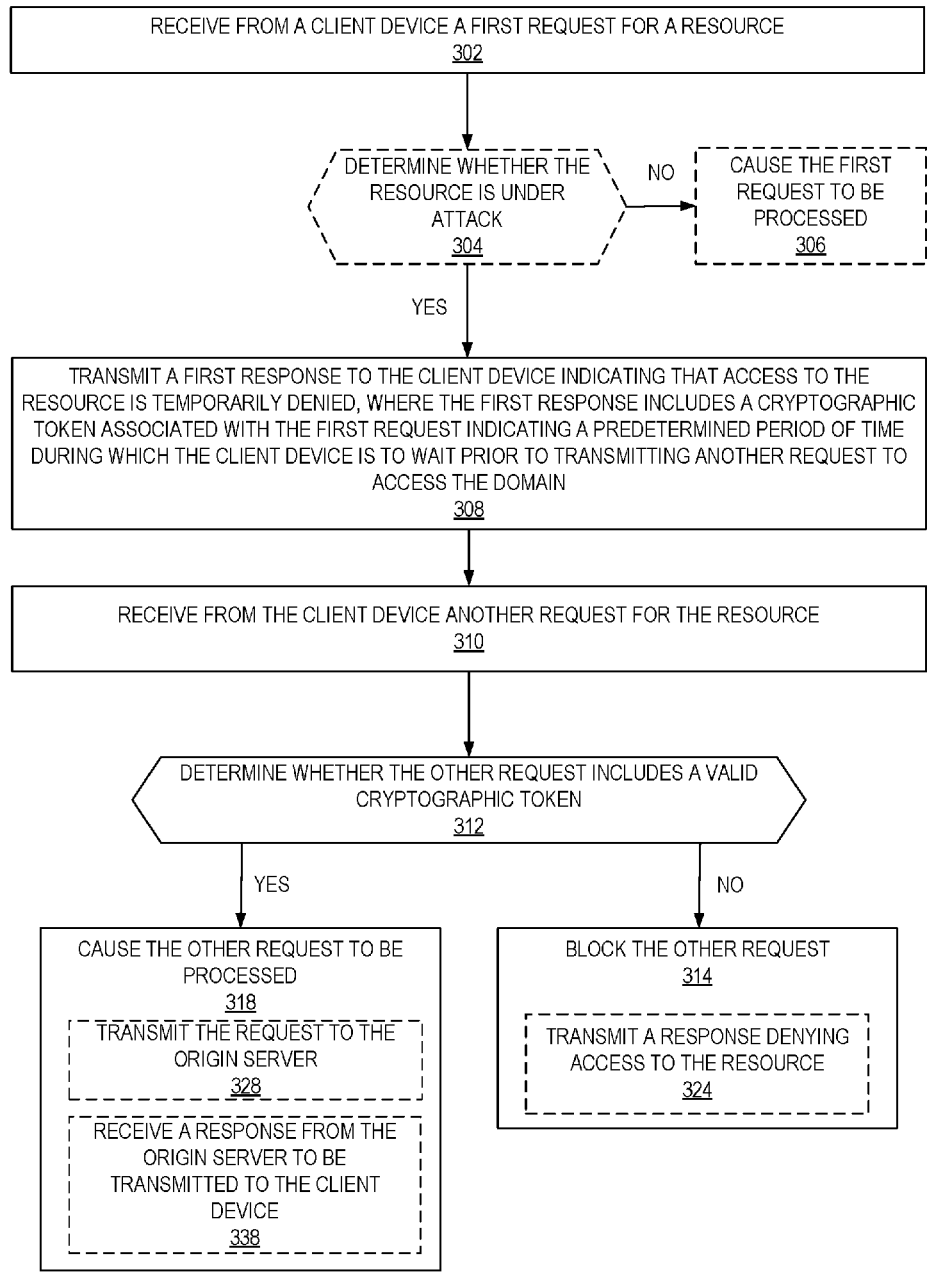
FIG. 3 illustrates a flow diagram of exemplary operations for causing a delay in processing requests for internet resources received from client devices according to one embodiment.

FIG. 3 illustrates a flow diagram of exemplary operations for causing a delay in processing requests for internet resources received from client devices according to one embodiment. The operations in the flow diagram of FIG. 3 will be described with reference to the exemplary embodiments of the FIGS. 1 and 2. However, it should be understood that the operations of the flow diagrams can be performed by embodiments of the invention other than those discussed with reference to the other figures, and the embodiments of the invention discussed with reference to these other figures can perform operations different than those discussed with reference to the flow diagram of FIG. 3. While the flow diagram in the figure show a particular order of operations performed by certain embodiments of the invention, it should be understood that such order is exemplary (e.g., alternative embodiments may perform the operations in a different order, combine certain operations, overlap certain operations, etc.).

FIG. 3 illustrates a flow diagram of exemplary operations performed at a server 120 for delaying processing of a request received from a client device 110. In some embodiments, these operations can be performed to protect the server 120 (or an origin server 130) from a brute-force attack on the internet resources (e.g., a brute force attack on an API, or a website, etc.). In some embodiments as described in further details above, the server 120 can be an origin server hosting the requested resources or alternatively a proxy server part of a cloud-based proxy service providing a service to an owner of the requested resources. At operation 302, the server 120 receives from a client device 110 a first request (e.g., 101) for a resource. The first request may be referred herein as the initial request. In some embodiments, the first request includes a first set of login credential (e.g., username and password/key) for accessing a cryptographically secure account. Flow then moves to operation 304 at which the server 120 determines whether the resource is suspected to be under attack. The determination that the resource is suspected to be under attack may be performed through various mechanisms some of which are described with reference to FIG. 1. For example, the server hosting the resources may be in an "under attack mode." In some embodiments, this step is skipped and the flow may move from operation 302 to operation 308 without the server 120 determining if the resource is suspected to be under attack. In some embodiments, if the server determines that the requested domain is not under attack (and therefore that the request is likely a legitimate request) flow moves to operation 306 at which the server 120 causes the first request to be processed.

Upon determining that the domain is not under attack, the server 120 analyzes the initial request 101 and takes one or more actions based on this request. The server 120 may process the request and transmit a response to the requesting client device 110. In some embodiments, if the initial request is a login request (e.g., API login request) with erroneous login credentials (username and password), the response may include a denial to access the requested resources. Alternatively when the login credentials are valid, the response may include the requested resources. In some embodiments, when the server 120 is a proxy server of a cloud-based proxy service, it analyzes the request and may transmit the initial request 101 (e.g., HTTP GET "example.com/login") to the appropriate origin server 130. The origin server 130 may process the request and then transmit the response (e.g., an HTTP response) with the requested resource to the proxy server. The proxy server may analyze the incoming response and take one or more actions, including, for example, transmitting the response to the requesting client device 110. In this embodiments, the proxy server may also cache resources for the domain and may retrieve the requested network resource from the cache without transmitting the request to the origin server 130. In one embodiment, if the requested resource is not in the local cache of the proxy server or the cached resource has expired, the proxy server may request the resource from the origin server 130.

In some embodiments, upon determining that the resource is suspected to be under attack, flow moves to operation 308 at which the server 120 transmits to the client device a first response (e.g., response 103) indicating that access to the resource is temporarily denied. The response includes a predetermined period of time during which the client device 110 is to wait prior to transmitting another request for the resource. The response may further include a cryptographic token that is not valid until the predetermined period of time has elapsed. In some embodiments, the cryptographic token can be valid for a second predefined amount of time following the predetermined period of time such that a server receiving the cryptographic token during the second predefined amount of time (after the first predetermined period of time has elapsed) is able to verify the validity of the token. The server 120 generates the cryptographic token such that the token value would be difficult to predict by malicious users (e.g., a botnet operator). The cryptographic token may be associated with the first request and/or the client device which transmitted the first request. For example, the cryptographic token may be generated based on the requested domain and/or the IP address of the client device transmitting the request. The token value may be generated in a number of different ways. For example, the token value may be generated using a cryptographic algorithm such as TOTP. As another example, a seeded pseudo-random number generator with a seed that is not publicly known (e.g., known only to the proxy server generating the pseudo-random number or to the cloud-based proxy service) may be used to generate the token value. As another example, an encrypted timestamp using a key that is not publicly known (e.g., a key known only to the proxy server generating the timestamp or known only to the cloud-based proxy service) may be used as the token value. As another example, a hashed and salted timestamp where the salt value is not publicly known (e.g., the salt value is known only to the server generating the timestamp or known only to the cloud-based proxy service, when the server 120 is a proxy server of the service) may be used as the token value. As yet another example, a hashed and salted timestamp where the salt value is publicly known but the timestamp has a random value appended to it that is not publicly known may be used as the token value.

Flow then moves to operation 310, the server 120 receives from the client device 110 a second request (e.g., request 201) for the resource. In some embodiments, the second request includes a second set of login credentials for accessing a cryptographically secure account. In some embodiments, the second set of login credential may be the same as the first set of login credential. While in some embodiments, this other request may provide from the same client device as the initial request, in other embodiments, the second request may provide from another client device (e.g., when a distributed attack occurs, a request for a resource may provide from different client devices). Flow then moves to operation 312 at which the server 120 determines whether the second request includes a valid cryptographic token.

In some embodiments, the response does not include a valid cryptographic token when the response either does not include a token or a token included in the response is invalid. For example, the token may be invalid if this following request is received at the server prior to the predetermined period of time has elapsed. When the response does not include a valid token, the flow moves to operation 314 at which the request and access to the resource is blocked. In one embodiment if the client device has attempted to alter the cryptographic token transmitted by the server 120 in a previous response (e.g., response 103) or alternatively if the token is transmitted before the predetermined period of time has elapsed, upon analysis of this token the server can detect the defect. In this case, the server blocks the request and may also log that the client device has been blocked (e.g., the IP address of the client device making the request may be added to a blacklist as suspicious and/or other rate limiting may be applied to the IP address of the client). In some embodiments, the server 120 may transmit, at operation 324, a response to the client device 110 indicating that the second request is a forbidden request (e.g., HTTP code 403 Forbidden).

When the token is determined to be valid indicating that the second request has been transmitted after the predetermined period of time has elapsed, the flow moves to operation 318 at which the server 120 causes the second request to be processed. In some embodiments, the second request is processed according to the first login credentials initially transmitted in the initial request and subsequently in the second request. The server 120 analyzes the request and takes one or more actions based on the request. The server 120 may process the request and transmit a response to the requesting client device 110. In some embodiments, if the initial request is a login request (e.g., an API login request) with erroneous login credentials (username and password), the response may include a denial to access the requested resources. Alternatively when the login credentials are valid, the response may include the requested resources. In some embodiments, when the server 120 is a proxy server of a cloud-based proxy service, it analyzes the request and may transmit the second request, at operation 328, to the appropriate origin server 130. The origin server 130 may process the request and then transmit the response with the requested resource to the proxy server. The proxy server may analyze the response received at operation 338, and take one or more actions, including, for example, transmitting the response to the requesting client device 110. In this embodiments, the proxy server may also cache resources for the domain (e.g., in cache 122) and may retrieve, the requested network resource from the cache without transmitting the request to the origin server 130. In one embodiment, if the requested resource is not in the local cache of the proxy server or the cached resource has expired, the proxy server may request the resource from the origin server 130.

In some embodiments prior to transmitting the response, the server 120 may be operative to delay the response by a second predetermined period of time introducing further delay in the response to the initial request in addition to the delay caused by the temporary denial of access and the request to retry the request only after the first predetermined period of time has elapsed.

Figure 4:
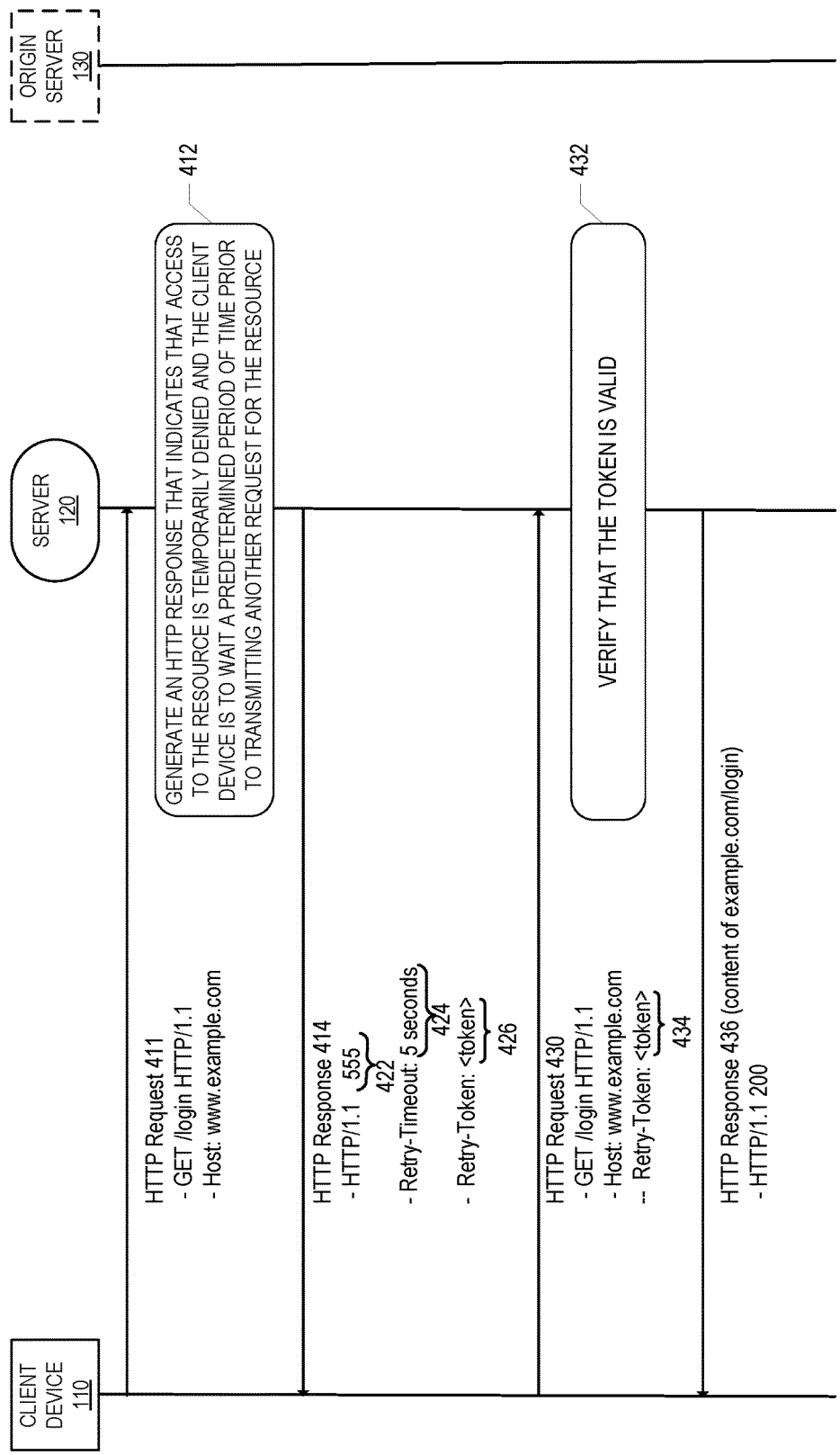
FIG. 4 illustrates a non-limiting example of requests and responses exchanged between a client device and a server in accordance with some embodiments.

FIG. 4 illustrates a non-limiting example of requests and responses exchanged between a client device and a server in accordance with some embodiments. The illustrated example provides an exemplary non-limiting example of requests and responses exchanged between the client device 110 and the server 120 of FIGS. 1 and 2. In one embodiment, the server 120 receives an HTTP request 411 from the client device 110. The server generates at operation 412 a response 414 and transmits it to the client device. The response 414 includes a new HTTP error code, for example, "555" indicating that the client device is to retry the request later. The value of the HTTP code set at "555" is intended to be exemplary only and other values may be selected to indicate that a request is temporarily denied and may be retransmitted only after a predetermined period of time has elapsed. The HTTP code 422 (e.g., 555) included in the response 414 informs the client device that the HTTP request 411 is temporarily denied and that the client device may retry retransmission of the request at a later time. The response 414 further includes an additional HTTP header (e.g., Retry Timeout) specifying a predetermined period of time 424 (e.g., 5 seconds) during which the client device is to wait prior to transmitting another request for the resources. The response further includes an HTTP header including a cryptographic token (426 <token>) that can be used to verify that the client device waited the predetermined period of time prior to transmitting a following request. As illustrated in FIG. 4A, the response 414 is of the form:

HTTP/1.1 555
Retry-Timeout: N seconds
Retry-Token: <token>

Where, the Retry-Timeout specifies the predetermined period of time that the client device 110 is to wait prior to transmitting another request following the transmission of a first request 411. In a non-limiting example, the Retry-timeout header may include a number of seconds 424 indicating the predetermined period of time (e.g., 5 seconds). The response further includes the Retry-Token header including a value of a cryptographic token 426 <token>. This value is used by the server 120 to confirm that the client device has in fact waited for the predetermined period of time (N seconds) prior to transmitting another request. The cryptographic token is associated with the client device (and/or the request) and is not valid until the predetermined period of time has elapsed (e.g., 5 seconds). In some embodiments, the cryptographic token can be valid for a second predefined amount of time following the predetermined period of time such that a server receiving the token receiving the token during the second predefined amount of time (after the first predetermined period of time has elapsed) is able to verify the validity of the token. In some embodiments, the cryptographic token may be generated based on the IP address of the client device and/or based on the domain at which the resources are hosted (e.g., based on the domain example.com).

In some embodiments, the new HTTP code (e.g., 555) indicating that the request is to be retried/retransmitted after a determined period of time is added as part of an API protocol, such that client network applications running on the client device may receive the new HTTP code as part of a response to an API request. In other embodiments, the new HTTP code may be received as part of a request from a client network application (e.g., web browser, mobile application, etc.). In these embodiments, the client network applications running on the client device 110 are operative to parse the new HTTP code.

At a later time, the server may receive another request 530 for the resource. This request 530 may provide from the same client device 110 or alternatively from a different client device (not illustrated). Upon receipt of the request 530, the server 120 verifies the validity of the cryptographic token at operation 443. If the response 530 does not include a valid token or alternatively does not include a token at all, the server 120 blocks the request. In some embodiments, the server 120 may transmit a response to the client device 110 indicating that the request 530 is a forbidden request (e.g., HTTP/1.1 403). In some embodiments, the IP address of the client device making the request may also be added to a blacklist as suspicious and/or other rate limiting may be applied to the IP address of the client device.

If the token is valid, indicating that the second request has been transmitted after the predetermined period of time 424 has elapsed, the server 120 causes the request 530 to be processed. The server 120 analyzes the retransmitted request and takes one or more actions based on the request. The server 120 may process the request and transmit a response 436 to the requesting client device 110. In some embodiments, if the request 530 is an API login request with erroneous login credentials (username and password), the response 436 may include a denial to access the requested resources. Alternatively when the login credentials are valid, the response may include the requested resources. In some embodiments, when the server 120 is a proxy server of a cloud-based proxy service, it analyzes the request and may transmit the request 530 to the appropriate origin server 130. The origin server 130 may process the request and then transmit the HTTP response 436 with the requested resource to the proxy server. The proxy server may analyze the incoming response 436 and take one or more actions, including, for example, transmitting the response to the requesting client device 110. In this example, the proxy server may also cache resources for the domain and may retrieve the requested resource from the cache without transmitting the request to the origin server 130.

In some embodiments prior to transmitting the response, the server 120 may be operative to delay the response 436 by a second predetermined period of time introducing further delay in the response to the initial request in addition to the delay caused by the temporary denial of access.

The mechanisms presented herein, force a malicious client to attempt accessing Internet resources only after a predetermined period of time has elapsed from a previous attempt. For example, when the predetermined period of time is equal to an exemplary 5 seconds, a client device can transmit a request to access resources every 5 seconds. These mechanisms slow down brute-force attacks such that an attacker (distributed or not) can try new login credentials to access an account only every few seconds, significantly reducing the efficiency of these attacks and enabling administrator/owners of the domain to stop the attacks.

Figure 5:
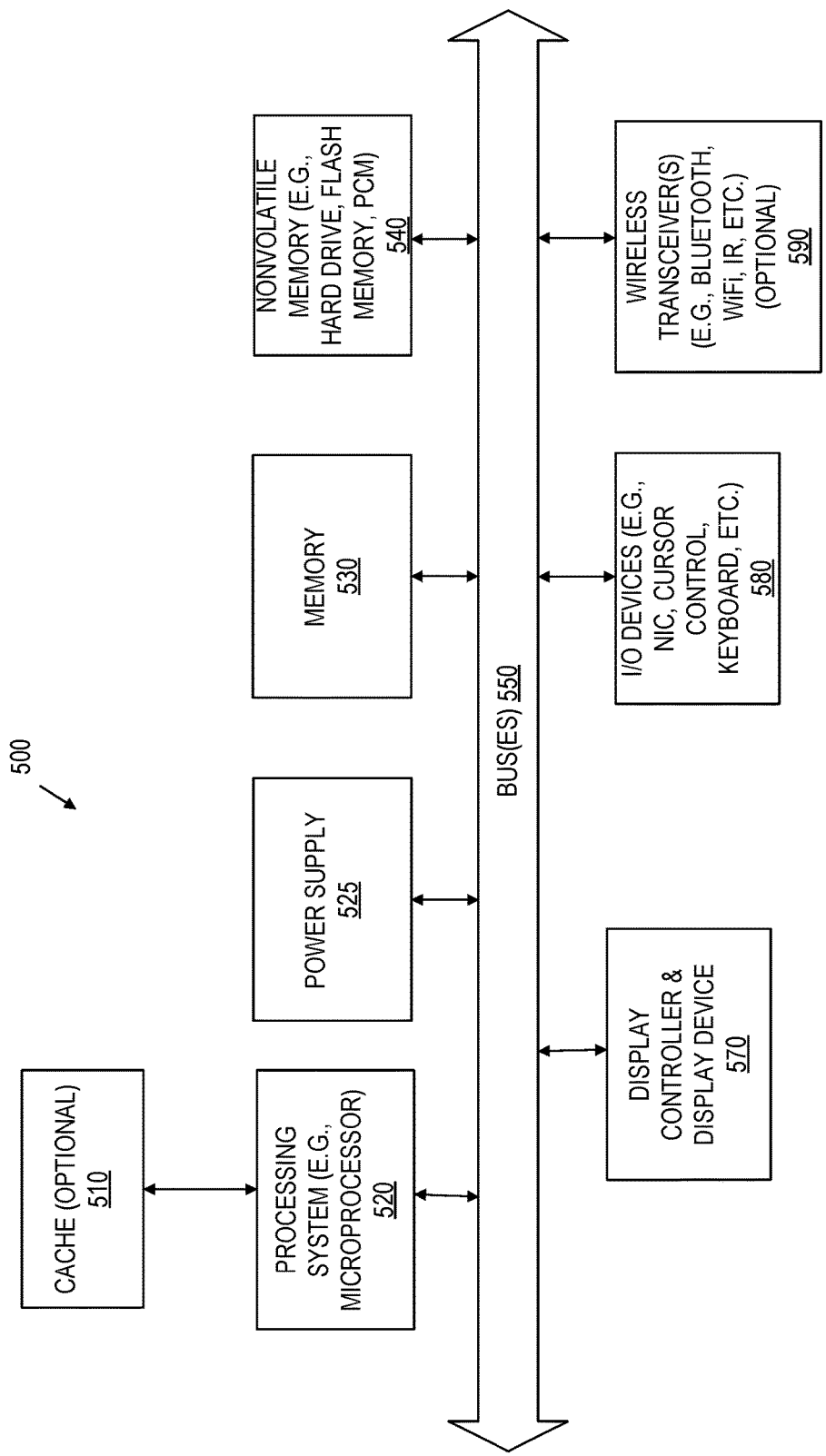
FIG. 5 is a block diagram illustrating an exemplary computer system according to some embodiments of the invention.

As illustrated in FIG. 5, the computer system 500, which is a form of a data processing system, includes the bus(es) 550 which is coupled with the processing system 520, power supply 525, memory 530, and the nonvolatile memory 540 (e.g., a hard drive, flash memory, Phase-Change Memory (PCM), etc.). The bus(es) 550 may be connected to each other through various bridges, controllers, and/or adapters as is well known in the art. The processing system 520 may retrieve instruction(s) from the memory 530 and/or the nonvolatile memory 540, and execute the instructions to perform operations described herein. The bus 550 interconnects the above components together and also interconnects those components to the display controller & display device 570, Input/Output devices 580 (e.g., NIC (Network Interface Card), a cursor control (e.g., mouse, touchscreen, touchpad, etc.), a keyboard, etc.), and the optional wireless transceiver(s) 590 (e.g., Bluetooth, WiFi, Infrared, etc.). In one embodiment, the client device 110, the service server 125, the server 120, and/or the origin servers 130 can take the form of the computer system 500.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of causing a delay in processing requests for resources received from client devices, the method comprising:
    receiving, from a first client device, a first request for a resource;
    transmitting a first response to the first client device indicating that access to the resource is temporarily denied and that the first client device is to wait a predetermined period of time prior to transmitting another request to access the resource;
    receiving from the first client device a second request for the resource;
    in response to determining that the second request is received after the predetermined period of time has elapsed, causing the second request to be processed;
    receiving from a second client device a third request for the resource; and
    in response to determining that the third request is received before the predetermined period of time elapses, blocking the third request.

2. The method of claim 1, wherein transmitting the first response to the first client device is performed in response to determining that the resource is suspected to be under attack.

3. The method of claim 2, wherein the first request includes first account information for securely accessing a user account, and wherein determining that the resource is suspected to be under attack includes at least in part determining that the first account information is invalid.

4. The method of claim 3, wherein determining that the resource is suspected to be under attack further includes determining that an Internet Protocol (IP) address associated with the first client device is included in a blacklist.

5. The method of claim 3, wherein determining that the resource is suspected to be under attack further includes that the first request follows one or more unsuccessful requests received from the first client device to access the resource indicating that the resource is under a brute force attack.

6. The method of claim 1, wherein the method is performed in a proxy server and the resource is hosted at an origin server, and wherein to receive the first, the second and the third request is a result of a DNS request for a domain associated with the resource resolving to the proxy server instead of the origin server.

7. The method of claim 6, wherein causing the second request to be processed includes:
    transmitting the second request to the origin server; and
    receiving a third response from the origin server to be transmitted to the first client device.

8. The method of claim 7, further comprising transmitting the third response to the first client device only after a second predetermined period of time has elapsed.

9. A server comprising:
    a non-transitory computer readable storage medium to store instructions; and
    a processor coupled with the non-transitory computer readable storage medium to process the stored instructions to:
    receive, from a first client device, a first request for a resource,
    transmit a first response to the first client device indicating that access to the resource is temporarily denied and that the first client device is to wait predetermined period of time prior to transmitting another request to access the resource,
    receive from the first client device a second request for the resource,
    in response to determining that the second request is received after the predetermined period of time has elapsed, cause the second request to be processed,
    receive from a second client device a third request for the resource, and
    in response to determining that the third request is received before the predetermined period of time elapses, block the third request.

10. The server of claim 9, wherein to transmit the first response to the first client device is to be performed in response to determining that the resource is suspected to be under attack.

11. The server of claim 10, wherein the first request includes first account information for securely accessing a user account, and wherein to determine that the resource is suspected to be under attack includes at least in part to determine that the first account information is invalid.

12. The server of claim 11, wherein to determine that the resource is suspected to be under attack further includes to determine that an Internet Protocol (IP) address associated with the first client device is included in a blacklist.

13. The server of claim 11, wherein to determine that the resource is suspected to be under attack further includes that the first request follows one or more unsuccessful requests received from the first client device to access the resource indicating that the resource is under a brute force attack.

14. The server of claim 9, wherein the server is a proxy server and the resource is hosted at an origin server, and wherein to receive the first, the second and the third request is a result of a DNS request for a domain associated with the resource resolving to the proxy server instead of the origin server.

15. The server of claim 14, wherein to cause the second request to be processed includes:
- to transmit the second request to the origin server; and
- to receive a third response from the origin server to be transmitted to the first client device.

16. The server of claim 15, wherein the processor is further to transmit the third response to the first client device only after a second predetermined period of time has elapsed.

17. A non-transitory computer readable storage medium that provide instructions, which when executed by a processor of a server, cause said processor to perform operations comprising:
- receiving, from a first client device, a first request for a resource;
- transmitting a first response to the first client device indicating that access to the resource is temporarily denied and that the first client device is to wait a predetermined period of time prior to transmitting another request to access the resource;
- receiving from the first client device a second request for the resource;
- in response to determining that the second request is received after the predetermined period of time has elapsed, causing the second request to be processed;
- receiving from a second client device a third request for the resource; and
- in response to determining that the third request is received before the predetermined period of time elapses, blocking the third request.

18. The non-transitory computer readable storage medium of claim 17, wherein transmitting the first response to the first client device is performed in response to determining that the resource is suspected to be under attack.

19. The non-transitory computer readable storage medium of claim 18, wherein the first request includes first account information for securely accessing a user account, and wherein determining that the resource is suspected to be under attack includes at least in part determining that the first account information is invalid.

20. The non-transitory computer readable storage medium of claim 19, wherein determining that the resource is suspected to be under attack further includes determining that an Internet Protocol (IP) address associated with the first client device is included in a blacklist.

21. The non-transitory computer readable storage medium of claim 19, wherein determining that the resource is suspected to be under attack further includes that the first request follows one or more unsuccessful requests received from the first client device to access the resource indicating that the resource is under a brute force attack.

22. The non-transitory computer readable storage medium of claim 17, wherein the server is a proxy server and the resource is hosted at an origin server, and wherein to receive the first, the second and the third request is a result of a DNS request for a domain associated with the resource resolving to the proxy server instead of the origin server.

23. The non-transitory computer readable storage medium of claim 22, wherein causing the second request to be processed includes:
- transmitting the second request to the origin server; and
- receiving a third response from the origin server to be transmitted to the first client device.

24. The non-transitory computer readable storage medium of claim 23, wherein the operations further include transmitting the third response to the first client device only after a second predetermined period of time has elapsed.

* * * * *